(12) United States Patent
Burch, Jr. et al.

(10) Patent No.: US 6,297,330 B1
(45) Date of Patent: Oct. 2, 2001

(54) POLYMERIZATIONS BASED ON CYCLIC OLIGOMER

(75) Inventors: Robert Ray Burch, Jr., Exton, PA (US); Alexa Ann Dembek, Midlothian, VA (US); Steven Raymond Lustig, Landenberg, PA (US); Maria Spinu, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/347,840

(22) Filed: Jul. 2, 1999

Related U.S. Application Data
(60) Provisional application No. 60/098,250, filed on Aug. 28, 1998.

(51) Int. Cl.$^7$ .............................. C08G 63/78; C08G 63/82
(52) U.S. Cl. ............................................. 525/444; 525/437
(58) Field of Search ...................................... 525/444, 437

(56) References Cited

U.S. PATENT DOCUMENTS

| | | | |
|---|---|---|---|
| 3,018,272 | * 1/1962 | Griffing | 528/293 |
| 5,281,669 | * 1/1994 | Kambour | 525/177 |
| 5,300,590 | 4/1994 | Cook et al. | 525/444 |
| 5,648,454 | 7/1997 | Brunelle | 528/491 |
| 5,663,282 | * 9/1997 | Todt | 528/274 |

FOREIGN PATENT DOCUMENTS

| | | | |
|---|---|---|---|
| 0 655 476 A1 | 5/1995 | (EP) | C08J/5/24 |
| 47-6425 | 2/1972 | (JP) . | |

* cited by examiner

*Primary Examiner*—Patricia A. Short

(57) ABSTRACT

This invention concerns a process for polymerizing cyclic oligomers to homopolymers or copolymers, conducted in the presence of one or more linear polymers.

13 Claims, 1 Drawing Sheet

POLYMERIZATIONS BASED ON CYCLIC OLIGOMER

This application claims priority benefit from U.S. Provisional Application Serial No. 60/098,250, filed Aug. 28, 1998.

FIELD OF THE INVENTION

This invention concerns a process for polymerizing cyclic oligomers in the presence of one or more linear polymers.

TECHNICAL BACKGROUND OF THE INVENTION

U.S. Pat. No. 5,648,454 (to GE) discloses synthesis of co-polyesters from co-cyclic compositions. This patent does not disclose polymerization in the presence of linear polymer.

EP 0 655 476 A1 (to GE) discloses polymerization of polyester cyclic oligomers specifying that the cyclic oligomers be free of linear polyester at the beginning of polymerization.

Modification of a premanufactured linear polyester by copolymerization with a polyester cyclic oligomer of different chemical composition with the intent of preparing polyesters of lower ultimate crystallinity is described in Cook, T. D.; Evans, T. L.; McAlea, K. P.; Pearce, E. J., U.S. Pat. No. 5,300,590 (1994) to GE.

JP 47-6425 (to Nippon Ester) discloses a means of post-polymerization molecular weight enhancement of linear polyester by adding cyclic oligomer to a melt of linear polyester. In this process, the linear polyester is made by conventional means and the cyclic simply provides on-line molecular weight enhancement. Our invention provides an entirely new method of making polyester.

There are many references on cyclic oligomer polymerization. However, none of these references teach the benefits of cyclic polymerization in the presence of linear polyesters which overcomes the high melting points of the cyclic oligomers, a difficulty often associated with cyclic oligomer polymerization.

SUMMARY OF THE INVENTION

This invention consists of polymerizing cyclic oligomers in the presence of one or more linear polymers which may be recycled from the product stream. The polymer product of this process may be a homopolymer or a co-polymer, depending on whether the chemical composition of the cyclic oligomer is the same as that of the linear polymer. Homopolymers or copolymers produced include those selected from the group consisting of polyethylene terephthalate, polypropylene terephthalate, polybutylene terephthalate, polyethylene naphthenate, polyethylene isophthalate and sulfonated polyethylene isophthalate, polyalkylene or sulfonated polyalkylene terephthalate, polyalkylene or sulfonated polyalkylene naphthenate, polyalkylene and sulfonated polyalkylene isophthalate.

This process provides rapid on-line polymerization or polymer modification at atmospheric pressure.

This invention overcomes the high melting points of the cyclic oligomers, a difficulty normally associated with cyclic oligomer polymerization. The process may be run either with or without a recycle loop, and is optionally conducted in the presence of a catalyst. For example, cyclic oligo (ethylene terephthalate) trimer melts at 321° C. (see J. Brandrup and E. H. Immergut, eds., Polymer Handbook, 3rd Edn., Wiley-Interscience, New York, 1989, page IV/50) which greatly exceeds the thermal stability of its linear polymer, poly(ethylene terephthalate). The use of ring-opening polymerization in the presence of the linear polymer as described herein facilitates the dissolution of the cyclic oligomer and subsequent reaction at temperatures such as 270–285° C. at which the polymer is thermally stable.

Specifically disclosed is a process for producing polymers including polyethylene terephthalate, polypropylene terephthalate, polybutylene terephthalate, polyethylene naphthenate, polyethylene isophthalate and sulfonated polyethylene isophthalate, polyalkylene or sulfonated polyalkylene terephthalate, polyalkylene or sulfonated polyalkylene naphthenate, polyalkylene and sulfonated polyalkylene isophthalate from cyclic oligomers selected from the group consisting of cyclic forms of polyethylene terephthalate, polypropylene terephthalate, polybutylene terephthalate, polyethylene naphthenate, polyethylene isophthalate and sulfonated polyethylene isophthalate.

The process as described can be done while the reacting mixture is in a solid-state, melt, slurry, suspension and/or solution state.

DETAILED DESCRIPTION OF THE INVENTION

Figure 1:
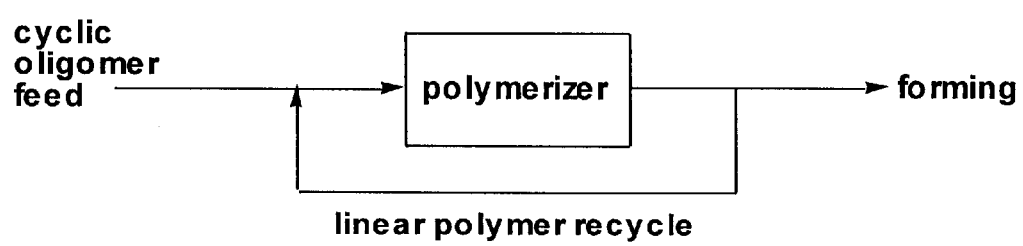
FIG. 1 shows a schematic of the present process, including a recycle loop.

Synthesis of cyclic oligomer can be by any of several methods, including extraction from linear polymer or direct conversion of linear polymer or pre-polymer or monorner(s) in solution or suspension to the cyclic form. Polymerization is at temperatures above the melting point of the linear polymer in the optional presence of a polymerization catalyst at atmospheric pressure, with agitation, for time periods of 2 minutes to 60 minutes. The catalysts include antimony, tin, aluminum, germanium, titanium compounds or their oxides, as well as Bronsted acids. A preferred catalyst is $Ti(O-i-C_3H_7)_4$ (titanium isopropoxide).

Polymers useful herein include polyethylene terephthalate, polypropylene terephthalate, polybutylene terephthalate, polyethylene naphthenate, or any co-polymer. The cyclic oligomer can include, but is not limited to, the cyclic forms of polyethylene terephthalate, polypropylene terephthalate, polybutylene terephthalate, polyethylene naphthenate, polyethylene isophthalate, or sulfonated polyethylene isophthalate. This process results in rapid on-line polymerization of homopolymers, or rapid on-line copolymerization under mild conditions to yield co-polymers.

Cyclic oligomers based on sulfonated isophthalic acid have been synthesized by the above method for making copolymers as polymer modification agents.

EXAMPLES

Example 1

Cyclic Oligomer Polymerization in the Presence of Linear Polymer

In these experiments the cyclic was polymerized in the presence of linear polymer. The linear polymer was prepared in an autoclave using 42 ppm Zn and 292 ppm Sb with no other additives. The polymer had 0.68 dL/g inherent viscosity with the following GPC numbers: Mn=13200, Mw=32200, Mz=50200. The polymerizations with cyclic oligomer were run at 50:50 cyclic oligomer/linear polymer with 100 ppm Ti added as 30 microliters of a concentrate of Ti(O-i-C$_3$H$_7$)$_4$ in hexadecane. The cyclic oligomer had the following end group analysis: 161 meq/kg and 184 meq/kg of glycol ends (duplicate determinations) and 1 meq/kg of acid ends. In some of these experiments, the glassware, polymer, and cyclic were pre-dried at 100° C. in a vacuum oven overnight. The results of the polymerization are in the table below.

concentration is near its equilibrium value of about 2.5 wt. %. The GPC shows after 3 minutes Mn=7281, Mw=27566, Mz=43992. Thermal analysis shows that full randomization is not achieved after 10 minutes at 285° C. under these conditions. The commercial 83/17 PET/PEI control (Crystare® Merge 1946) has a crystallization half time of about 30 minutes, while the experimental polymer has a crystallization half time of about 0.6 minutes. The heat of fusion is also higher for the experimental polymer compared to the control. This suggests our conditions yield a blocky structure.

Polymerization of PET cyclic oligomer in an equal weight of PET linear polymer at 280° C., 1 atm. pressure

| Run | Polym. Time | IV(dL/g) | Mn[a] | Mw[a] | residual cyclic[b] | Comment |
|---|---|---|---|---|---|---|
| — | — | 0.68 | 13200 | 32200 | 1.7% | control: linear polymer used in the cyclic polymerization |
| A | 10 min | 0.54 | 6570 | 24200 | 8.3% | did not pre-dry polymer or cyclic |
| B | 30 min | 0.58 | 9760 | 26000 | 3.3% | did not pre-dry polymer or cyclic |
| C | 10 min | 0.57 | 4920 | 26600 | 5.3% | pre-dried polymer and cyclic |
| D | 30 min | 0.89 | 9890 | 38900 | 1.8% | pre-dried polymer and cyclic |
| E | 10 min | 0.67 | 6240 | 27400 | 3.3% | replicate of run C |
| F | 30 min | 0.71 | 8260 | 31600 | 2.5% | replicate of run D |

[a]GPC data is uncorrected for the contribution from cyclic oligomer, giving artificially high polydispersities
[b]These numbers are uncorrected for GPC response factors

POLYMERIZATION REACTIONS

In a typical polymerization, 0.50 g of cyclic oligomer was charged into a test tube reaction vessel equipped with an overhead stirrer and a side arm for nitrogen inlet, the charging operation being carried out in an inert atmosphere drybox. The reaction vessel was transferred into the fume hood, placed under nitrogen, and heated at the desired reaction temperature using a Wood's metal bath. After the reactants melted, the desired amount of catalyst was added by syringe, using a catalyst solution in Ph$_2$O, and the polymerization was carried out under nitrogen. For most polymerizations described in this study, Ti(O-i-C$_3$H$_7$)$_4$ was used as the catalyst, at 100 ppm Ti level. Samples were removed from the reaction vessel as a function of time for analysis by gel permeation chromatography and differential scanning calorimetry.

Conversion in the polymerization reactions is calculated from the area under the corresponding GPC peaks, by applying a response factor. The response factor ($R_f$) provides the correction for the difference in the detector response for PET cyclics and high molecular weight PET linear chains. In order to determine $R_f$, a constant volume of 0.01 M solution of the PET cyclic trimer, and high molecular weight PET in HFIP were injected into the GPC columns, and the areas under the corresponding elution peaks were measured. The response factor was obtained as the ratio of the two areas and was used in all conversion calculations, using $R_f = A_{PET\ polymer}/A_{PET\ cyclics} = 1.394$.

Post-Polymerization Co-Polymer Synthesis

A Haake® batch reactor of nominal capacity 75 grams was charged with high molecular weight commercial PET. This was melted at 285° C., and PEI cyclic oligomers were added as a powder, to obtain 83/17 PET/PEI ratio. GPC analysis of the reaction mixture as a function of time indicates nearly complete consumption of the cyclic oligomers after 3 minutes, with ~6% cyclic oligomer remaining. After 10 minutes under these conditions, the cyclic oligomer The co-polymers derived under these conditions have composition dependent melting temperatures similar to that of commercial PET/PEI copolymers synthesized by conventional melt polymerization. At 9% isophthalate content, the melting point depression is about 10° C., and the extent of crystallinity is not practically affected, as measured by the heat of fusion. However, at 13% isophthalate content, the melting temperature is depressed by 40° C. and the degree of crystallinity is significantly reduced.

Example 2

Synthesis of Sulfonated Polyethylene Isophthalate Cyclic Oligomer

The following describes a synthesis of this cyclic oligomer as the lithium salt. Disclosed is the synthesis of the sodium salt and the tetrabutyl ammonium salt. Also disclosed is the modification of nylon and polyester with this material.

A nitrogen-flushed and blanketed 250 mL, 3 neck round bottom flask equipped with a mechanical stirrer, a claissen-type distillation head, condenser, and heating mantle was charged with 150 mL of an 80:20 mixture of phenyl sulfone/phenyl ether solvent mix. The phenyl sulfone was used as received from the vendor, while the phenyl ether was purified by distillation. The flask was further charged with 15 g of the lithium salt of sulfonated isophthalic acid as the bis ester with ethylene glycol, as a 6.6% solids solution in ethylene glycol. The reaction was charged with 1.2 mL of a solution of Ti(O-i-C$_3$H$_7$)$_4$ that was 0.42 g of Ti(O-i-C$_3$H$_7$)$_4$ in 50 mL of toluene. The mixture was heated with stirring to distill a mixture of ethylene glycol and some solvent. Some solids formed after 20 minutes. The over head temperature steadily rose to 276° C. Distillation ceased after 80 minutes. The product was allowed to settle out of the reaction mixture after turning off the agitation and heat source. A total of 10 mL of distillate was collected. The product was isolated by decanting off the solvent, and product was washed with a hexanes/acetone mixture and dried under vacuum at 50° C.

Analysis showed this product to be the lithium salt of the sulfonated isophthalic acid ethylene glycol cyclic dimer, with small amounts of higher cyclic oligomers.

What is claimed is:

1. A process for polymerizing cyclic oligomers, wherein cyclic oligomers are polymerized as homopolymers or co-polymers, said process conducted in the presence of one or more linear polymers, conducted with a recycle loop for recycling linear polymer to the process, wherein the linear polymer is recycled to an oligomer feed by means of the recycle loop, and optionally conducted in the presence of a polymerization catalyst, wherein the cyclic oligomer is selected from the group consisting of cyclic forms of polyethylene terephthalate, polypropylene terephthalate, polybutylene terephthalate, polyethylene naphthenate, polyethylene isophthalate, sulfonated cyclic oligoester and sulfonated polyethylene isophthalate, and wherein the linear polymer is selected from the group consisting of polyethylene terephthalate, polypropylene terephthalate, polybutylene terephthalate, polyethylene naphthenate, and any co-polymer thereof.

2. The process of claim 1 wherein the homopolymers or copolymers are selected from the group consisting of polyethylene terephthalate, polypropylene terephthalate, polybutylene terephthalate, polyethylene naphthenate, polyethylene isophthalate and sulfonated polyethylene isophthalate, polyalkylene or sulfonated polyalkylene terephthalate, polyalkylene or sulfonated polyalkylene naphthenate, polyalkylene and sulfonated polyalkylene isophthalate.

3. The process of claim 1 wherein a catalyst is present.

4. The process of claim 3 wherein the catalyst is selected from the group consisting of metals and oxides of antimony, tin, aluminum, germanium and titanium compounds and Bronsted acids.

5. The process of claim 4 wherein the catalyst is titanium isopropoxide.

6. The process of claim 1 or claim 2, wherein the reaction mixture is in a state selected from the group consisting of solid-state, melt, slurry, suspension and solution.

7. A process for polymerizing cyclic oligomers, wherein cyclic oligomers are polymerized as homopolymers or co-polymers, said process conducted in the presence of one or more linear polymers, optionally conducted with a recycle loop for recycling linear polymer to the process, and optionally conducted in the presence of a polymerization catalyst, wherein the cyclic oligomer is a sulfonated cyclic oligoester and wherein the linear polymer is selected from the group consisting of polyethylene terephthalate, polypropylene terephthalate, polybutylene terephthalate, polyethylene naphthenate, and any co-polymer thereof.

8. The process of claim 7 wherein the homopolymers or copolymers are selected from the group consisting of polyethylene terephthalate, polypropylene terephthalate, polybutylene terephthalate, polyethylene naphthenate, polyethylene isophthalate and sulfonated polyethylene isophthalate, polyalkylene or sulfonated polyalkylene terephthalate, polyalkylene or sulfonated polyalkylene naphthenate, polyalkylene and sulfonated polyalkylene isophthalate.

9. The process of claim 7 wherein the linear polymer is recycled to an oligomer feed by means of a recycle loop.

10. The process of claim 7 wherein a catalyst is present.

11. The process of claim 10 wherein the catalyst is selected from the group consisting of metals and oxides of antimony, tin, aluminum, germanium and titanium compounds and Bronsted acids.

12. The process of claim 11 wherein the catalyst is titanium isopropoxide.

13. The process of claim 7 wherein the reaction mixture is in a state selected from the group consisting of solid-state, melt, slurry, suspension and solution.

* * * * *